Figure 1:
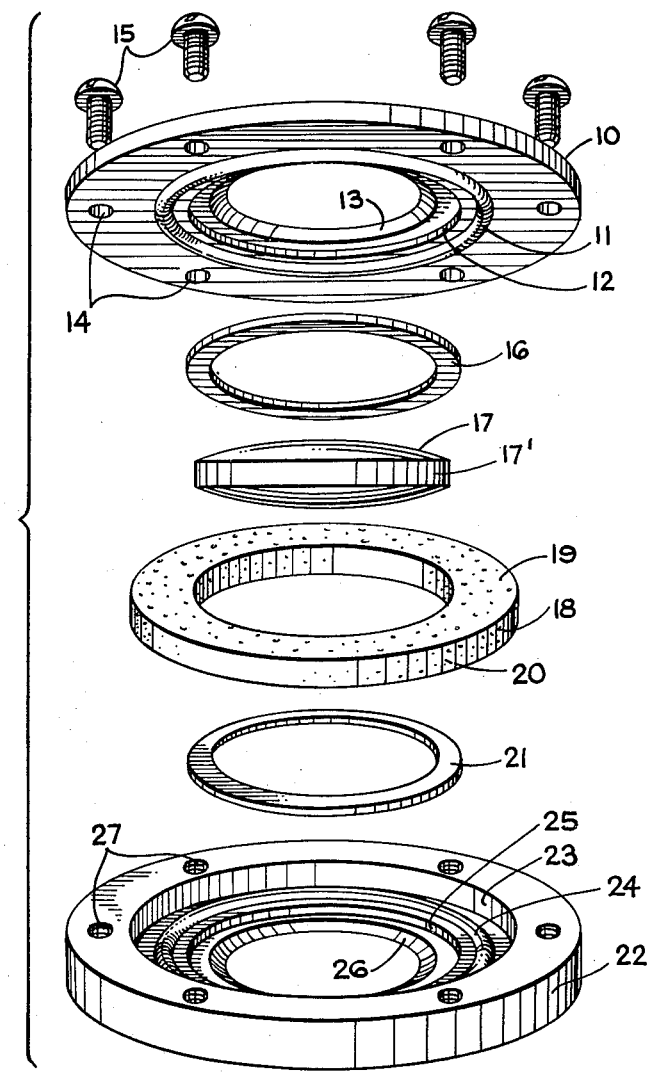

July 13, 1965 F. L. KOLM 3,194,364
VACUUM SEAL
Filed June 27, 1963

INVENTOR.
FREDERICK L. KOLM
BY Elliott & Pastoriza
ATTORNEYS

United States Patent Office 3,194,364
Patented July 13, 1965

3,194,364
VACUUM SEAL
Frederick L. Kolm, Encino, Calif., assignor to Spectrolab, a corporation of California
Filed June 27, 1963, Ser. No. 291,041
6 Claims. (Cl. 189—64)

This invention relates generally to vacuum seals and more particularly, to an improved seal for positioning and sealing disc shaped objects such as lenses in chamber walls in which outside atmospheric pressure is exerted on one side of the chamber and a high vacuum is maintained within the chamber.

Conventional vacuum sealing of objects such as lenses is effected by "O-rings." However, certain problems are involved with the use of such "O-rings." First, the surrounding frame structure incorporating the "O-ring" is subject to dimensional changes as a consequence of temperature variations. These temperature variations cannot always be accommodated by the expansion or contraction of the material making up the "O-ring," and oftentimes will cause shifting of a lens or other object supported by the "O-ring." Alternatively, possible cracking of the lens may occur. Moreover, the manner of installation of the "O-rings" is such that a portion of the lens surface about its periphery may be obscured by the mounting structure.

Another problem with "O-rings" is the precise and accurate machining required for forming the ring grooves. Each particular "O-ring" supporting structure must be designed for the particular object to be supported. Thus, close tolerances are required and once the seal is effected, there is no practical means of tightening the seal after prolonged use should dimensional changes occur in the supported body.

Finally, "O-rings" are usually provided in standard sizes which will not always accommodate the dimensions of the object or lens to be supported. In other words, there is very little tolerance for different diameter objects to be supported and as a result, the most efficient use of the "O-rings" cannot be realized.

With all of the foregoing considerations in mind, it is a primary object of this invention to provide a greatly improved vacuum type seal in which the foregoing problems are substantially avoided.

More particularly, it is an object to provide an improved vacuum seal capable of accommodating relatively large temperature variations resulting in expansion and contraction of the dimensions of both the object being supported as well as the supporting frame structure.

Another important object is to provide an improved vacuum seal which will hold an object properly centered or in a consistent position notwithstanding variations in the dimensions of the supporting frame structure due to temperature changes.

Another object is to provide an improved vacuum seal which can accommodate various different sizes of objects to be supported and which may be adjusted after prolonged use to compensate for dimensional changes and thus maintain a tight seal at all times.

Still another object is to provide an improved vacuum seal which obscures a minimum portion of the lens surface in the event a lens is to be supported so that the most efficient use is realized from the lens.

Other objects of this invention are to provide an improved vacuum seal which does not require close machining tolerances in the frame structure forming part of the vacuum seal, which is adaptable to different shaped objects to be supported, and which may be manufactured and installed relatively economically as compared to conventional high grade "O-ring" type seals.

Briefly, these and other objects and advantages of this invention are attained by providing a pair of clamping plates having central cut-out openings for receiving a disc shaped object such as a lens or other object to be supported. These plates in turn cooperate with an annular shaped expandable sealing member of larger outside diameter than the inside diameter of the openings in the plates so that the sealing member may be sandwiched between the plates in coaxial relationship therewith. This sealing member is arranged to surround the periphery of the object to be supported, such as the lens. The plates themselves include an annular backing engaging the outer periphery of the sealing member to prevent or block radial outward expansion of the member. With this arrangement, when a squeezing force is applied between the clamping plates in a direction normal to the plane of the plates and openings, the sealing material will be displaced radially inwardly thereby exerting over 360 degrees a pressing force against the periphery of the object to be supported.

This squeezing force exerted on the plates may be increased after prolonged use to effect further radially inwardly directed expansion of the sealing member. However, because of the expandable nature of the member, its stored energy upon initial squeezing of the plates will continuously result in a force against the outer periphery of the object and thus even though temperature changes occur tending to change the dimensions of the object and of the frame structure, the stored energy within the sealing member will cause expansion to accommodate such changes.

Figure 2:
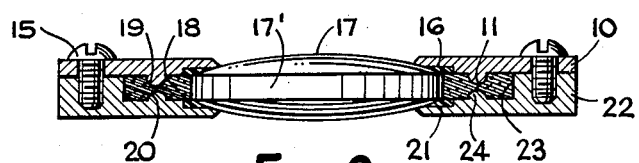

A better understanding of the invention will be had by now referring to one embodiment thereof as illustrated in the accompanying drawings, in which:

FIGURE 1 is an exploded perspective view of the various components making up the vacuum seal of this invention; and, FIGURE 2 is an assembly view partly in cross-section of the various components illustrated in FIGURE 1.

Referring first to FIGURE 1, the vacuum seal includes a first clamping plate 10 preferably in the form of a ring. As shown, the lower surface of the plate 10 includes an annular ridge 11 projecting in a downward direction normal to the plane of the plate. The central portion of the plate includes a small annular cavity 12 and a central cut-out opening 13. Also, the plate 10 includes a plurality of bore openings 14 uniformly distributed outside the ridge 11 and passing normally through the plate 10. These bores are arranged to receive screws 15.

Below the plate 10, there is illustrated a plastic spacing ring 16 adapted to seat within the smaller annular cavity 12. A disc shaped object such as a lens 17 in turn is arranged to have its periphery 17′ surrounded by an expandable annular sealing member 18, ring 16 and lens 17 being received within the confines of the annular ridge 11. As shown, the expandable annular sealing member 18 has flat opposite surfaces 19 and 20. The outer diameter of the sealing member is greater than the inner diameter of the central opening 13 of the plate 10 and its thickness is at least as great as the peripheral thickness of the lens.

Shown below the annular sealing member 18 is a second annular plastic spacing ring 21 and below the ring 21 is shown a second clamping plate 22. The second clamping plate 22 includes a central recessed area having a diameter corresponding substantially to the outside diameter of the sealing member 18. This recessed area serves to define an annular back or wall 23 and includes an annular ridge 24 projecting upwardly normally from the floor of the recess having a diameter radially inside the diameter of the backing or wall 23. A small annular cavity 25, similar to the cavity 12, is formed at the edge of the recess to accommodate the plastic spacing ring 21. The second plate member 22 also includes a central cut-out opening 26 as shown. This central opening 26 corresponds in diameter to that of the central opening 13 of the first clamping plate 10 and thus is of smaller diameter than the outside diameter of the sealing member 18. Threaded screw holes 27 are provided adjacent to the periphery of the second plate 22 in positions corresponding to the bores in the first plate 10.

With the foregoing description of the separate components in mind, the assembly thereof and operation of the vacuum seal will be evident by now referring to FIGURE 2. As shown, the lens 17 with the annular sealing member 18 surrounding the periphery 17' is adequately supported by the seal 18 and clamping plates 10 and 22. The arrangement is such that the rear annular periphery of the sealing member 18 abuts over 360 degrees against the annular backing or wall 23 of the second plate member 22 and the inner periphery of this annular sealing member is in direct engagement with the periphery 17' of the lens 17. With the plates 10 and 22 sandwiching the annular sealing member 18 as shown, the ridges 11 and 24 are in opposed relationship and will thus press into the opposite surfaces 19 and 20 of the sealing member 18. The spacing rings 16 and 21 provide a cushioning for the peripheral portions of the central openings of the plates 10 and 22 with respect to the surfaces of the lens 17 adjacent the lens periphery 17'.

It will be evident that if the screws 15 are now threaded tightly within the threaded openings 27 of the second plate member, a squeezing force will be applied, but since the backing 23 prevents outward expansion movement of the expandable annular seal 18, the seal will be forced to move radially inwardly and thus press in tight engagement against the periphery 17' of the lens 17. The ridges themselves displace the expandable sealing member so that stored energy is effected therein and there will always be maintained a uniform radially inwardly directed pressure against the periphery of the lens.

Thus, contraction or expansion of the lens and/or clamp plates 10 and 22 may take place without disturbing the central positioning of the lens 17. Again, this is because such expansion and contraction would be accommodated by the expansion of the seal member 18 in a radially inward or radially outward direction.

It is possible, of course, to further tighten the screws 15 and thus increase the stored energy after the device has been in use for some time should the lens 17 shrink an undue amount.

Further, it will be evident that with the foregoing structure, the dimensions of the lens 17 or other disc shaped object to be supported are not critical in that adjustment of the annular sealing member may be effected by varying the squeezing force between the annular clamping rings or plates 10 and 22. Since the inwardly radially directed force of the sealing member against the lens 17 is uniform over 360 degrees, shifting of the lens will not take place but it will always remain properly positioned with respect to a central stationary axis.

Finally, with the construction shown, close tolerances are not necessary because of the accommodation realizable through use of the unique annular sealing member 18.

From the foregoing description, it will thus be evident that the present invention has provided a structure in which the various objects set forth heretofore are fully realized. While a particular vacuum type seal has been shown with respect to supporting a lens, it will be understood by those skilled in the art that various other shaped objects may be supported and that the particular shapes of the clamping rings, sealing member, ridges, and other components are not necessarily restricted to those shown merely for illustrative purposes.

What is claimed is:

1. A vacuum seal for supporting the periphery of an object in sealing relationship, comprising, in combination: first and second clamping rings; an annular expandable sealing member having an inner surface adapted to surround the periphery of said object and opposite surfaces adapted to be sandwiched between said clamping rings, the inner openings of said rings and annular sealing member being coaxial and the outside diameter of said sealing member being greater than the inside diameters of said clamping rings; and means cooperating with said clamping rings to exert a squeezing pressure normal to the plane of said rings on said opposite surfaces of said annular sealing member to cause radially inwardly directed movement of said inner surface in a plane between said clamping rings to thereby exert a radial pressure against the periphery of said object over 360 degrees.

2. A vacuum seal according to claim 1, in which said clamping rings include annular opposed ridges for engaging said opposite surfaces of said sealing member and in which said means to exert a squeezing force comprises a plurality of screws circumferentially distributed adjacent to the periphery of said clamping rings and passing normally therein.

3. A vacuum seal according to claim 2, including annular plastic rings spacing the peripheral edges of said object on either side of said sealing member with respect to the inner periphery of the openings in said clamping rings.

4. A vacuum seal for supporting the periphery of a disc shaped object having a given thickness at its periphery, comprising, in combination: first and second clamping plates having central cut-out openings; an annular expandable sealing member having an inner surface of thickness at least equal to said given thickness adapted to surround the periphery of said disc shaped objects, the outside diameter of said sealing member being greater than the inside diameter of said central openings so that the outer opposite surface portions of said annular sealing member may be sandwiched between said first and second plates, one of said plates including an annular backing engaging over 360 degrees the outer periphery of said sealing member to prevent radial outward expansion thereof; and means for exerting a squeezing force on said plates in a direction normal to the plane of said annular sealing member to effect inward radial movement of said inner surface in a plane between said clamping plates to press against the periphery of said disc shaped object over 360 degrees.

5. A vacuum seal according to claim 4, in which said second plate includes an annular recessed area of diameter corresponding substantially to the outer diameter of said sealing member to define with its central opening an annular shoulder for seating said sealing member, said annular backing being defined by the annular wall of said shoulder, said shoulder including an annular ridge projecting normally to the plane of said central opening and positioned radially inwardly of said annular backing and radially outwardly of said central opening, and said first plate including an annular ridge projecting normally and positioned radially outwardly of the central opening of said first plate and in opposed relationship to said first mentioned annular ridge, said ridges being urged into opposite surfaces of said sealing member to effect inward radial expansion thereof when said squeezing force is applied to said first and second plates.

6. A vacuum seal according to claim 5, in which said means for exerting said squeezing force include a plurality of independently adjustable screws passing normally through said first plate in uniformly circumferentially spaced positions outside the annular ridge on said first plate, said screws being threadedly received in correspondingly located threaded openings in said second plate.

References Cited by the Examiner

UNITED STATES PATENTS

| | | | |
|---|---|---|---|
| 1,566,983 | 12/25 | Sheriff | 215—40 |
| 1,977,788 | 10/34 | Allen | 20—39 |
| 3,000,345 | 9/61 | Gray et al. | |

HARRISON R. MOSELEY, *Primary Examiner.*